US011060429B2

(12) United States Patent
Girardi et al.

(10) Patent No.: US 11,060,429 B2
(45) Date of Patent: Jul. 13, 2021

(54) DIESEL EXHAUST FLUID QUALITY BASED DOSING ADJUSTMENT, ALERTS, AND INDUCEMENT

(71) Applicant: GM GLOBAL TECHNOLOGY OPERATIONS LLC, Detroit, MI (US)

(72) Inventors: Nicholas Girardi, Milford, MI (US); Sarah Funk, Canton, MI (US); David P. Quigley, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 35 days.

(21) Appl. No.: 16/524,419

(22) Filed: Jul. 29, 2019

(65) Prior Publication Data

US 2021/0033010 A1 Feb. 4, 2021

(51) Int. Cl.
*F01N 3/00* (2006.01)
*F01N 3/08* (2006.01)
*F01N 3/20* (2006.01)

(52) U.S. Cl.
CPC .......... *F01N 3/0871* (2013.01); *F01N 3/208* (2013.01); *F01N 3/0842* (2013.01); *F01N 2610/02* (2013.01); *F01N 2610/146* (2013.01); *F01N 2610/1406* (2013.01); *F01N 2610/148* (2013.01)

(58) Field of Classification Search
CPC ...... F01N 3/0871; F01N 3/208; F01N 3/0842; F01N 2610/148; F01N 2610/1406; F01N 2610/02; F01N 2610/146
See application file for complete search history.

(56) References Cited

U.S. PATENT DOCUMENTS

| | | | |
|---|---|---|---|
| 9,804,004 B1* | 10/2017 | Kruse | G01N 29/222 |
| 2012/0304744 A1* | 12/2012 | Takahashi | F01N 3/2066 73/61.43 |
| 2013/0104638 A1* | 5/2013 | Takahashi | F02D 41/1461 73/114.71 |
| 2014/0150405 A1* | 6/2014 | Johnson | F01N 3/18 60/274 |
| 2014/0182274 A1* | 7/2014 | Toukairin | F01N 9/00 60/287 |
| 2016/0115838 A1* | 4/2016 | Girardi | F01N 9/00 701/102 |
| 2016/0320349 A1* | 11/2016 | Murphy | G01N 29/024 |
| 2017/0107879 A1* | 4/2017 | Nocereto | F01N 3/208 |
| 2018/0094562 A1* | 4/2018 | Kruse | F01N 3/2066 |
| 2018/0128142 A1* | 5/2018 | Collins | F01N 11/002 |
| 2018/0148041 A1* | 5/2018 | Light-Holets | B60W 10/04 |
| 2019/0309671 A1* | 10/2019 | Rajagopal | F01N 11/00 |
| 2020/0018209 A1* | 1/2020 | Carpinisan | F01N 3/208 |
| 2020/0256230 A1* | 8/2020 | Yasuda | F01N 3/2066 |

* cited by examiner

*Primary Examiner* — Phutthiwat Wongwian
*Assistant Examiner* — Sherman D Manley
(74) *Attorney, Agent, or Firm* — Harness, Dickey & Pierce, P.L.C.

(57) ABSTRACT

A diesel exhaust fluid (DEF) control system includes: a target module configured to determine a target rate of injection of a DEF by a DEF injector; an adjustment module configured to determine an adjustment based on a concentration of urea in the DEF; an adjusting module configured to adjust the target rate based on the adjustment to produce an adjusted rate of injection of the DEF by the DEF injector; and an injector control module configured to control injection of the DEF by the DEF injector based on the adjusted rate.

20 Claims, 3 Drawing Sheets

DIESEL EXHAUST FLUID QUALITY BASED DOSING ADJUSTMENT, ALERTS, AND INDUCEMENT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to exhaust control systems and methods and more particularly to systems and methods for diesel exhaust fluid (DEF) injection control systems and methods.

Air is drawn into an engine through an intake manifold. A throttle valve controls airflow into the engine. The air mixes with fuel from one or more fuel injectors to form an air/fuel mixture. The air/fuel mixture is combusted within one or more cylinders of the engine. Combustion of the air/fuel mixture generates torque.

Exhaust resulting from the combustion of the air/fuel mixture is expelled from the cylinders to an exhaust system. The exhaust may include particulate matter (PM) and gas. The exhaust gas includes nitrogen oxides (NOx), such as nitrogen oxide (NO) and nitrogen dioxide ($NO_2$). A treatment system reduces NOx and PM in the exhaust.

The exhaust flows from the engine to an oxidation catalyst (OC). The OC removes hydrocarbons and/or carbon oxides from the exhaust. The exhaust flows from the OC to a selective catalytic reduction (SCR) catalyst. A diesel exhaust fluid (DEF) injector injects a DEF (e.g., including urea) into the exhaust stream, upstream of the SCR catalyst. Ammonia ($NH_3$) provided by the DEF is absorbed by the SCR catalyst. Ammonia reacts with NOx in the exhaust passing the SCR catalyst.

A dosing module controls the mass flow rate of DEF injected by the DEF injector. In this manner, the dosing module controls the supply of ammonia to the SCR catalyst and the amount of ammonia stored by the SCR catalyst. The amount of ammonia stored by the SCR catalyst is referred to as current storage (e.g., grams). The percentage of NOx input to the SCR catalyst that is removed from the exhaust is referred to as the NOx conversion efficiency. The NOx conversion efficiency is related to the current storage of the SCR catalyst. For example, the NOx conversion efficiency increases as the current storage of the SCR catalyst increases and vice versa. The dosing module may control the injection of DEF, for example, to maximize the NOx conversion efficiency.

SUMMARY

In a feature, a diesel exhaust fluid (DEF) control system includes: a target module configured to determine a target rate of injection of a DEF by a DEF injector; an adjustment module configured to determine an adjustment based on a concentration of urea in the DEF; an adjusting module configured to adjust the target rate based on the adjustment to produce an adjusted rate of injection of the DEF by the DEF injector; and an injector control module configured to control injection of the DEF by the DEF injector based on the adjusted rate.

In further features, a sensor is configured to measure the concentration of urea in the DEF.

In further features, the sensor is configured to measure the concentration of urea in the DEF in a DEF tank.

In further features: the adjustment module is configured to set the adjustment to a predetermined value in response to a determination that a fault is present in the sensor; and the adjusting module is configured to set the adjusted rate equal to the target rate in response to the adjustment being set to the predetermined value.

In further features, the adjusting module is configured to set the adjusted rate based on the target rate multiplied by the adjustment.

In further features, the adjustment module is configured to increase the adjustment as the concentration of urea in the DEF decreases.

In further features, the adjustment module is configured to decrease the adjustment as the concentration of urea in the DEF increases.

In further features, the adjusting module is configured to set the adjusted rate based on the target rate plus the adjustment.

In further features, the adjustment module is configured to increase the adjustment as the concentration of urea in the DEF decreases.

In further features, the adjustment module is configured to decrease the adjustment as the concentration of urea in the DEF increases.

In further features, an alert module is configured to output an alert when the concentration of urea in the DEF is less than a first predetermined concentration.

In further features, the first predetermined concentration is greater than 20 percent urea by volume and less than 30 percent urea by volume.

In further features, an inducement module is configured to initiate an inducement event when the concentration of urea in the DEF is less than a second predetermined concentration.

In further features, the second predetermined concentration is less than the first predetermined concentration.

In further features, an engine control module is configured to, during the inducement event, limit torque output of a diesel engine to limit a speed of a vehicle to less than or equal to a predetermined maximum speed.

In further features, an engine control module is configured to, during the inducement event, limit a range of a vehicle to less than or equal to a predetermined maximum range.

In further features, the adjustment module is configured to determine the adjustment using a lookup table that relates concentrations of urea to adjustments.

In further features, entries of the lookup table are non-linear.

In further features, the adjustment module is configured to determine the adjustment using an equation that relates concentrations of urea to adjustments.

In a feature, a diesel exhaust fluid (DEF) control method includes: determining a target rate of injection of a DEF by a DEF injector; determining an adjustment based on a concentration of urea in the DEF; adjusting the target rate based on the adjustment thereby producing an adjusted rate of injection of the DEF by the DEF injector; and controlling injection of the DEF by the DEF injector based on the adjusted rate.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A control module controls injection of a diesel exhaust fluid (DEF) into an exhaust system upstream of a selective catalytic reduction (SCR) catalyst. The SCR catalyst receives exhaust output by an engine of a vehicle. The exhaust includes nitrogen oxides (NOx). The DEF includes urea and water. Heat from the exhaust converts urea from the DEF into ammonia ($NH_3$). The SCR catalyst stores ammonia. Ammonia reacts with NOx in the exhaust thereby reducing the amount of NOx that is output from the SCR catalyst.

The control module determines a target rate of injection of DEF, for example, to minimize NOx output. According to the present disclosure, the control module determines an adjustment based on a concentration of urea in the DEF measured by a sensor. The concentration of urea in the DEF corresponds to a quality of the DEF. For example, the quality of the DEF may be said to decrease as the concentration of urea decreases and vice versa.

The control module adjusts the target rate based on the adjustment to produce an adjusted target rate of DEF injection. The control module controls DEF injection at the adjusted target rate.

Additionally, the control module also outputs a poor DEF quality alert when the concentration of urea in the DEF is less than a first predetermined concentration. For example, the control module may illuminate a light indicating that the DEF is of poor quality or display a message on a display indicative of the DEF being of poor quality. The control module initiates an inducement event when the concentration of urea in the DEF is less than a second predetermined concentration that is less than the first predetermined concentration. During the inducement event, vehicle speed is limited and a range of the vehicle may be limited to induce a driver of the vehicle to increase the quality of the DEF, such as by replacing the DEF with higher quality DEF.

The above enables DEF injection to be adjusted based on the concentration of urea of the DEF and initiating inducement only when the concentration of urea is less than the second predetermined concentration. The adjustments can be made non-proportionally (non-linearly) to take into account NOx conversion efficiency. The poor DEF quality alert, however, will be output to alert a user to the DEF being of low quality when the concentration is greater than the second predetermined concentration but less than the first predetermined concentration.

Figure 1:
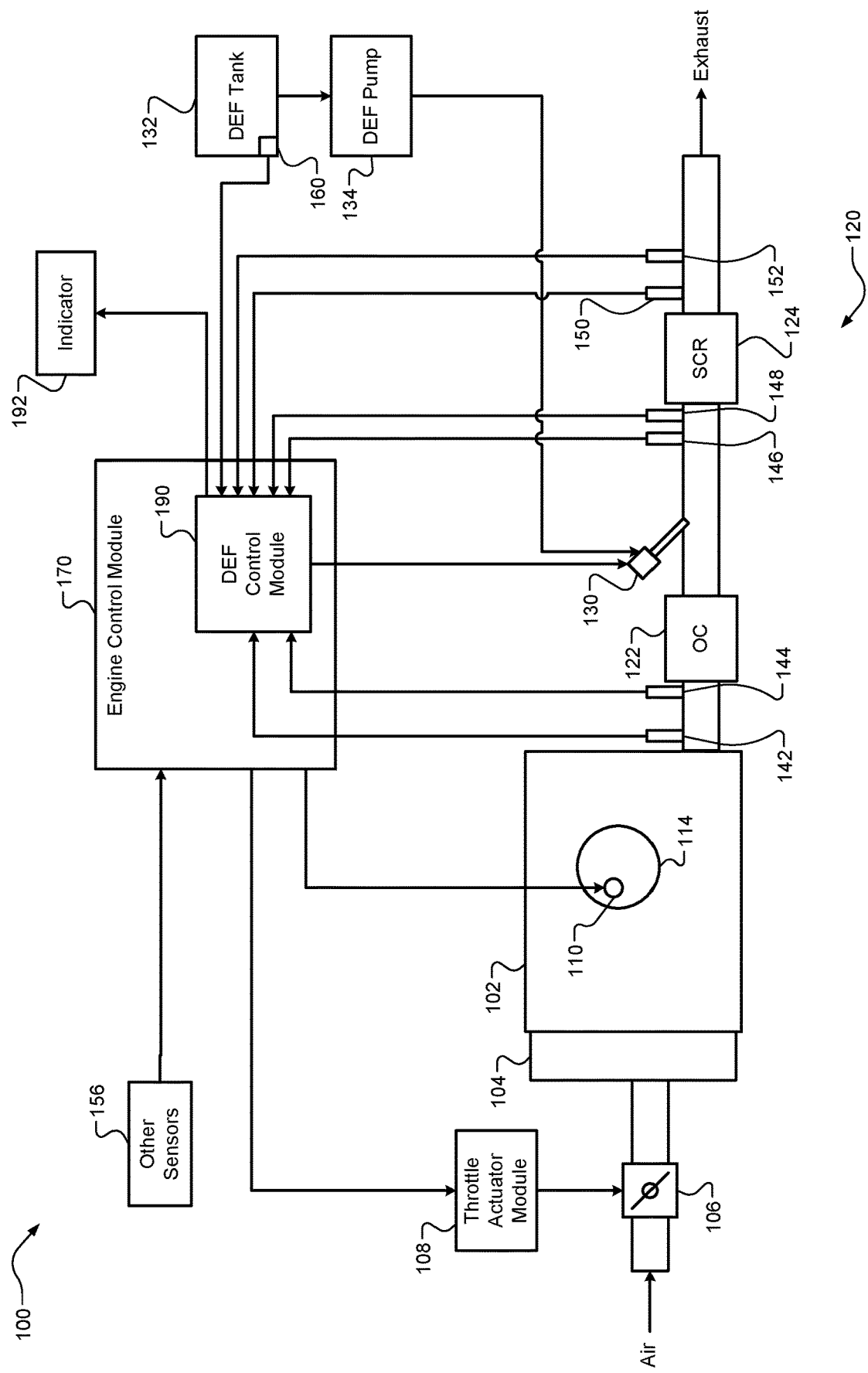
FIG. 1 is a functional block diagram of an example engine system.

Referring now to FIG. 1, a functional block diagram of an example engine system 100 is presented. An engine 102 generates drive torque for a vehicle. While the engine 102 is shown and will be discussed as a diesel engine, the engine 102 may be another suitable type of engine, such as a spark-combustion engine or another type of compression combustion engine. One or more electric motors (or motor-generators) may additionally generate drive torque.

Air is drawn into the engine 102 through an intake manifold 104. Airflow into the engine 102 may be varied using a throttle valve 106. A throttle actuator module 108 controls opening of the throttle valve 106. One or more fuel injectors, such as fuel injector 110, mix fuel with the air to form an air/fuel mixture. The air/fuel mixture is combusted within cylinders of the engine 102, such as cylinder 114. Although the engine 102 is depicted as including one cylinder, the engine 102 may include more than one cylinder.

Exhaust is expelled from the engine 102 to an exhaust system 120. The exhaust may include particulate matter (PM) and exhaust gas. The exhaust (gas) includes nitrogen oxides (NOx), such as nitrogen oxide (NO) and nitrogen dioxide ($NO_2$). The exhaust system 120 includes a treatment system that reduces the respective amounts of NOx and PM in the exhaust.

The exhaust system 120 includes an oxidation catalyst (OC) 122 and a selective catalytic reduction (SCR) catalyst 124. The exhaust system 120 may also include a particulate filter (not shown). The exhaust flows from the engine 102 to the OC 122. For example only, the OC 122 may include a diesel oxidation catalyst (DOC). The exhaust flows from the OC 122 to the SCR catalyst 124. The exhaust may flow from the SCR catalyst 124 to the particulate filter. In various implementations, the particulate filter may be implemented in a common housing with the SCR catalyst 124. For example only, the particulate filter may include a diesel particulate filter (DPF).

A diesel exhaust fluid (DEF) injector 130 injects a DEF into the exhaust system 120 upstream of the SCR catalyst 124. For example only, the DEF injector 130 may inject the DEF at a location between the OC 122 and the SCR catalyst 124 The DEF includes urea ($CO(NH_2)_2$) and water. The DEF is stored in a DEF tank 132. A DEF pump 134 draws DEF from the DEF tank 132 and pumps the DEF to the DEF injector 130.

Urea from DEF injected by the DEF injector 130 reacts with the exhaust to produce ammonia, and ammonia is supplied to the SCR catalyst 124. Heat (e.g., from the exhaust) evaporates the water in the DEF, and ammonia is supplied to the SCR catalyst 124. Example chemical equations that are illustrative of the decomposition of urea to ammonia are provided below.

$CO(NH_2)_2 \rightarrow NH_3 + HCNO$ (thermolysis, occurs in exhaust)

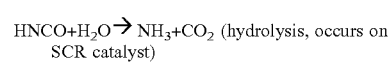

$HNCO + H_2O \rightarrow NH_3 + CO_2$ (hydrolysis, occurs on SCR catalyst)

The SCR catalyst 124 stores (i.e., absorbs) ammonia supplied by the DEF. For example only, the SCR catalyst 124 may include a vanadium catalyst, a zeolite catalyst, and/or another suitable type of SCR catalyst. An example chemical equation that is illustrative of ammonia absorption is provided below.

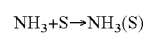

$NH_3 + S \rightarrow NH_3(S)$

The SCR catalyst 124 catalyzes a reaction between stored ammonia and NOx passing the SCR catalyst 124. The amount of ammonia stored by the SCR catalyst 124 is referred to as current storage. The current storage may be expressed as a mass of ammonia (e.g., grams), a number of moles of ammonia, or another suitable measure of the amount of ammonia stored by the SCR catalyst 124.

NOx and ammonia react at a known rate, which may be referred to as a reaction rate. The reaction rate may be described by the equation:

$$RR = \frac{X \text{ Moles NH}_3}{1 \text{ Mole NOx}},$$

where RR is the reaction rate and X varies depending on the amount of nitrogen dioxide ($NO_2$) in the exhaust. For example only, X may vary between from 1.0 and 1.333.

A percentage of NOx input to the SCR catalyst 124 that is removed from the exhaust via reaction with ammonia may be referred to as NOx conversion efficiency. The NOx conversion efficiency is directly related to the current storage of the SCR catalyst 124. For example only, the NOx conversion efficiency increases as the current storage of the SCR catalyst 124 increases.

The current storage of the SCR catalyst 124, however, is limited to a maximum amount of ammonia. This maximum amount of ammonia is referred to as the maximum storage capacity of the SCR catalyst 124. Maintaining the current storage of the SCR catalyst 124 near the maximum storage capacity ensures that a maximum amount of NOx is removed from the exhaust. In other words, maintaining the current storage near the maximum storage capacity may ensure that a greatest possible NOx conversion efficiency is achieved.

However, maintaining the current storage at or near the maximum storage capacity also increases the possibility that ammonia will be exhausted from the exhaust system 120. Exhausting ammonia from the exhaust system 120 may be referred to as ammonia slip. The increased possibility of ammonia slip may be attributable to the inverse relationship between the maximum storage capacity and the temperature of the SCR catalyst 124. More specifically, the maximum storage capacity decreases as the SCR temperature increases, and the decrease in the maximum storage capacity may cause ammonia to desorb (i.e., release) from the SCR catalyst 124. In other words, an increase in the SCR temperature causes a decrease in maximum storage capacity, and ammonia stored in excess of this decreased maximum storage capacity may desorb from the SCR catalyst 124. Thus, an increase in the SCR temperature may cause ammonia slip. An example chemical equation that is illustrative of ammonia desorption is provided below.

$$NH_3(S) \rightarrow NH_3 + S$$

All or a portion of the ammonia supplied by the dosing agent may oxidize before or after being absorbed by the SCR catalyst 124. For example, ammonia may react with oxygen in the exhaust to produce nitrogen ($N_2$) and water ($H_2O$). Ammonia oxidation may be triggered by, for example, heat. Example chemical equations that are illustrative of ammonia oxidation are provided below.

$$4NH_3 + 3O_2 \rightarrow 2N_2 + 6H_2O$$

$$2NH_3 + 2O_2 \rightarrow N_2O + 3H_2O$$

$$4NH_3 + 5O_2 \rightarrow 4NO + 6H_2O$$

The reaction of ammonia with NOx produces nitrogen and water. Other components of the exhaust, such as oxygen ($O_2$), may also be involved in the ammonia and NOx reaction. The example chemical equations provided below are illustrative of the reaction of ammonia and NOx.

$$4NH_3 + 4NO + O_2 \rightarrow 4N_2 + 6H_2O$$

$$4NH_3 + 2NO + 2NO_2 \rightarrow 4N_2 + 6H_2O$$

$$8NH_3 + 6NO_2 \rightarrow 7N_2 + 12H_2O$$

An upstream NOx sensor 142 measures NOx in the exhaust at a location upstream of the OC 122 (upstream NOx). For example only, the upstream NOx sensor 142 may measure a mass flowrate of NOx (e.g., grams per second), a concentration of NOx (e.g., parts per million), or another suitable measure of the amount of NOx. In various implementations, the upstream NOx sensor 142 may be omitted and the input NOx may be modeled based on one or more engine operating parameters.

A first temperature sensor 144 measures a temperature of the exhaust upstream of the OC 122 (first temperature). An oxygen sensor 146 measures oxygen ($O_2$) in the exhaust at a location between the OC 122 and the SCR catalyst 124. A second temperature sensor 148 measures a temperature of the exhaust at a location between the OC 122 and the SCR catalyst 124 (second temperature). For example only, the oxygen sensor 146 and the second temperature sensor 148 may be located between where the DEF injector 130 injects the DEF and the SCR catalyst 124.

A downstream NOx sensor 150 measures NOx in the exhaust at a location downstream of the SCR catalyst 124 (downstream NOx). For example only, the downstream NOx sensor 150 may measure a mass flowrate of NOx (e.g., grams per second), a concentration of NOx (e.g., parts per million), or another suitable measure of the amount of NOx. The downstream NOx sensor 150 may also be cross-sensitive to ammonia. Therefore, the measurements of the downstream NOx sensor 150 may reflect both NOx and ammonia in the exhaust downstream of the SCR catalyst 124. A third temperature sensor 152 measures a temperature of the exhaust downstream of the SCR catalyst 124 (third temperature).

One or more other sensors 156 may be implemented in the engine system 100. For example only, the other sensors 156 may include a mass air flowrate (MAF) sensor, an exhaust flow rate (EFR) sensor, an intake air temperature (IAT) sensor, a coolant temperature sensor, a manifold absolute pressure (MAP) sensor, an engine speed (RPM) sensor, an exhaust pressure sensor, and/or one or more other suitable sensors.

An engine control module (ECM) 170 controls a torque output of the engine 102. The ECM 170 may include a DEF control module 190 that controls the injection of the DEF. For example only, the DEF control module 190 may control the timing and rate of DEF injection. By controlling DEF injection, the DEF control module 190 therefore controls the supply of ammonia to the SCR catalyst 124 and the current storage of the SCR catalyst 124.

The rate at which DEF is injected may be referred to as a dosing rate (e.g., grams per second), and the rate at which ammonia is supplied to the SCR catalyst 124 may be referred to as an ammonia supply rate (e.g., grams per second). The DEF control module 190 may determine a target supply rate for supplying ammonia to the SCR catalyst 124, determine a target dosing rate to achieve the target supply rate, and control the injection of DEF at the target dosing rate.

As stated above, the DEF includes urea and water. DEF can include up to 35% urea by volume when mixed with water. A DEF quality sensor 160 measures a quality of the DEF, for example, in the DEF tank 132 or in another suitable location before injection. For example, the DEF quality sensor 160 may measure a concentration of urea in the DEF.

If the DEF has a greater or lesser amount of urea than expected, the target dosing rate may be too high or too low. According to the present application, the DEF control module 190 adjusts the target dosing rate based on a DEF quality adjustment. The DEF control module 190 determines the DEF quality adjustment based on the quality of the DEF. For example, the DEF control module 190 may decrease the DEF quality adjustment as the DEF quality increases and vice versa. This adjusts the target dosing rate to account for the concentration of urea in the DEF.

The DEF control module 190 also selectively outputs a poor DEF quality alert based on the quality of the DEF. For example, the DEF control module 190 may output the poor DEF quality alert when the concentration of urea in the DEF is less than a first predetermined concentration. The DEF control module 190 may, for example, illuminate a poor DEF quality indicator 192 of the vehicle and/or display a poor DEF quality message on a display of the vehicle. The poor DEF quality alert may prompt a user to add higher quality DEF to the DEF tank 132.

The DEF control module 190 may selectively initiate an inducement event based on the quality of the DEF. For example, the DEF control module 190 may initiate an inducement event when the quality of the DEF is less than a second predetermined concentration that is less than the first predetermined concentration. The inducement event may induce a user to add higher quality DEF to the DEF tank 132 or replace the DEF in the DEF tank 132 with higher quality DEF.

During the inducement event, the ECM 170 may limit a speed of the vehicle to a predetermined maximum speed and allow the vehicle to travel for up to a predetermined maximum distance. If the vehicle travels the predetermined maximum distance without the inducement event ending, the ECM 170 may take one or more other remedial actions, such as preventing vehicle movement and/or limiting an engine speed to a predetermined idle speed. The DEF control module 190 may end the inducement event when the quality of the DEF is greater than the second predetermined concentration.

Figure 2:
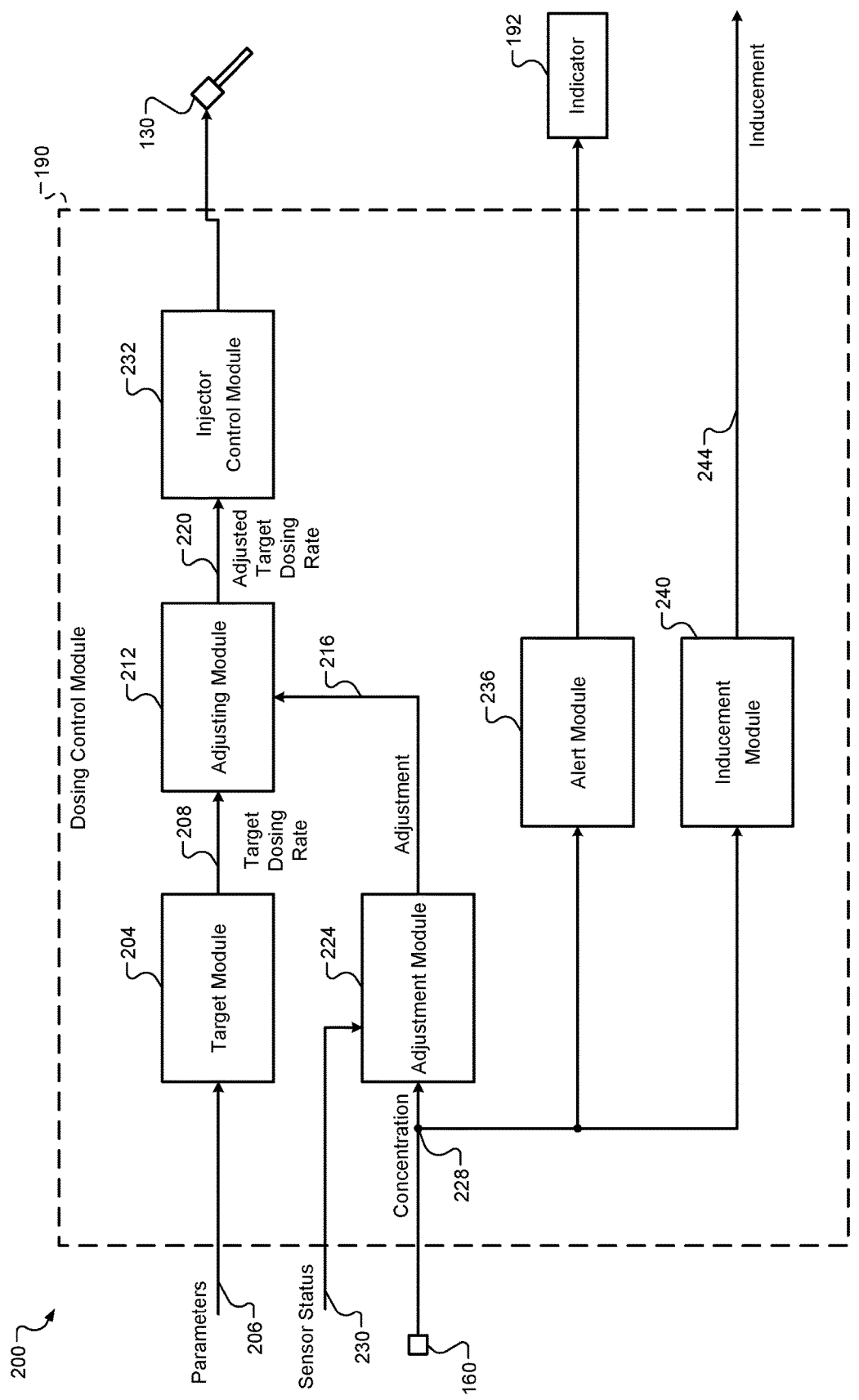
FIG. 2 is a functional block diagram of an exemplary selective catalytic reduction (SCR) catalyst control system.

Referring now to FIG. 2, a functional block diagram of an example DEF control system 200 including the DEF control module 190 is presented. A target module 204 determines a target dosing rate 208, for example, based on a target supply rate. The target module 204 may determine the target dosing rate 208 using one of a lookup table and an equation that relates target supply rates to target dosing rates. The target dosing rate 208 corresponds to an injection rate of the DEF to achieve the target supply rate of ammonia to the SCR catalyst 124. The target supply rate corresponds to a desired rate to supply ammonia to the SCR catalyst 124.

The target module 204 may determine the target supply rate, for example, based on a target current storage for the SCR catalyst 124, a current storage of the SCR catalyst 124, the upstream NOx, and/or one or more other parameters 206. The target module 204 may determine the target supply rate, for example, to maximize the NOx conversion efficiency, to minimize the downstream NOx, to minimize ammonia slip, and/or to achieve one or more other suitable goals.

The target module 204 may determine the target current storage based on a percentage of a present maximum storage capacity of the SCR catalyst 124. The target module 204 may determine the present maximum storage capacity based on a present temperature of the SCR catalyst 124. For example only, the maximum storage capacity decreases as the temperature of the SCR catalyst 124 increases, and vice versa. The target module 204 may determine the percentage based on, for example, an engine speed, an engine load, and the temperature of the SCR catalyst 124. The temperature of the SCR catalyst 124 may be measured using a temperature sensor or estimated, for example, based on the first, second, and third temperatures in various implementations.

The target module 204 may determine the current storage of the SCR catalyst 124. For example only, the target module 204 may estimate the current storage of the SCR catalyst 124 based on the target supply rate, the upstream NOx, the downstream NOx, and/or one or more other suitable parameters. The target module 204 may estimate the NOx conversion efficiency, for example, based on the current storage of the SCR catalyst 124, the target supply rate, the upstream NOx, one or more of the temperatures, exhaust flow rate (EFR), and/or one or more other suitable parameters. The EFR may be measured using an EFR sensor (not shown) or determined based on, for example, the MAF.

An adjusting module 212 adjusts the target dosing rate 208 based on an adjustment 216 to produce an adjusted target dosing rate 220. For example, the adjusting module 212 may set the adjusted target dosing rate 220 based on or equal to the target dosing rate 208 multiplied by the adjustment 216. As another example, the adjusting module 212 may set the adjusted target dosing rate 220 based on or equal to the target dosing rate 208 plus the adjustment 216.

An adjustment module 224 determines the adjustment 216 (value) based on a concentration 228 of urea (e.g., by volume) in the DEF measured by the DEF quality sensor 160. The concentration 228 of urea in the DEF corresponds to a quality of the DEF. Generally speaking, the quality of the DEF increases as the concentration 228 of urea increases and vice versa.

The adjustment module 224 determines the adjustment 216 using one of a lookup table and an equation that relates concentrations to adjustments. The following table includes example adjustment values corresponding to different concentrations.

| Concentration | 24 | 25 | 26 | 27 | 28 | 29 | 32.5 | 35 |
|---|---|---|---|---|---|---|---|---|
| Adjustment | 1.5 | 1.4 | 1.3 | 1.2 | 1.1 | 1.0 | 1.0 | 1.0 |

The above table may be used in the example of multiplying the target dosing rate 208 by the adjustment 216. A similar table could be used in the example of adding the adjustment 216 to the target dosing rate 208. In the example of the use of a lookup table, for concentrations between concentration entries of the table, the adjustment module 224 may use interpolation (e.g., linear). The adjustment values may be calibrated to be non-linear (non-proportional) from concentration to concentration to take into consideration NOx conversion efficiency. In the example lookup table above, the adjustment values are non-linear.

The adjustment module 224 also receives a status 230 of the DEF quality sensor 160. The status 230 indicates whether one or more faults have been diagnosed in the DEF quality sensor 160. For example, a diagnostic module may set the status 230 to a first state when one or more faults have been diagnosed in the DEF quality sensor 160. The diagnostic module may set the status 230 to a second state when no faults have been diagnosed in the DEF quality sensor 160.

The adjustment module 224 may set the adjustment 216 based on the concentration 228 when the status 230 is in the second state. When the status 230 is in the first state, the adjustment module 224 may set the adjustment 216 to a predetermined non-adjusting value independent of the concentration 228. When the adjustment 216 is set to the predetermined non-adjusting value, the adjusting module 212 will set the adjusted target dosing rate 220 equal to the target dosing rate 208. In the example of multiplying the adjustment 216 by the target dosing rate 208, the predetermined non-adjusting value may be 1.0. In the example of adding the adjustment 216 to the target dosing rate 208, the predetermined non-adjusting value may be 0.0.

An injector control module 232 applies power (e.g., from a battery) to the DEF injector 130 to achieve the adjusted target dosing rate 220. The injector control module 232 may apply power to the DEF injector 130, for example, using a pulse width modulation (PWM) signals or another suitable type of signal. For example, the injector control module 232 may set a duty cycle (i.e., a percentage of time ON during a predetermined period of time) of a PWM signal to achieve the adjusted target dosing rate 220 and apply the PWM signal to the DEF injector 130.

An alert module 236 selectively outputs the poor DEF quality alert based on the concentration 228 of urea. For example, the alert module 236 may output the poor DEF quality alert when the concentration 228 of urea in the DEF is less than a first predetermined concentration of urea by volume. The alert module 236 may not output the poor DEF quality alert when the concentration 228 of urea is greater than the first predetermined concentration. The first predetermined concentration may be calibratable and may be, for example only, greater than 20% urea by volume and less than 30% urea. For example only, the first predetermined concentration may be 25% urea or another suitable value. The alert module 236 may, for example, illuminate the poor DEF quality indicator 192 of the vehicle. Additionally or alternatively, the alert module 236 may display a message indicative of the quality of the DEF being poor on a display of the vehicle. While the example of visual alerts is provided, the alert module 236 may additionally or alternatively output an audible alert indicative of poor DEF quality. Despite the poor DEF quality, vehicle performance (e.g., vehicle speed and/or range) may not be limited.

An inducement module 240 controls performance of inducement. The inducement module 240 may determine whether to perform an inducement event based on the concentration 228 of urea in the DEF. For example, the inducement module 240 may initiate or continue an inducement event when the concentration 228 of urea is less than a second predetermined concentration of urea. The inducement module 240 may end or continue to not perform an inducement event when the concentration 228 of urea is greater than the second predetermined concentration. The second predetermined concentration is less than the first predetermined concentration of urea. The second predetermined concentration may be calibratable and may be, for example, approximately 20% urea or another suitable value.

The inducement module 240 may set an inducement signal 244 to a first state to perform an inducement event. The inducement module 240 may set the inducement signal 244 to a second state to not perform an inducement event. Performing an inducement event may induce a user to add higher quality DEF to the DEF tank 132 or replace the DEF in the DEF tank 132 with higher quality DEF.

When the inducement signal 244 is in the first state, the ECM 170 may limit the speed of the vehicle to the predetermined maximum speed and allow the vehicle to travel for up to the predetermined maximum distance. If the vehicle travels the predetermined maximum distance during an inducement event without the inducement event ending, the ECM 170 may take one or more other remedial actions, such as limiting the engine 102 to idling and prevent further vehicle movement.

Figure 3:
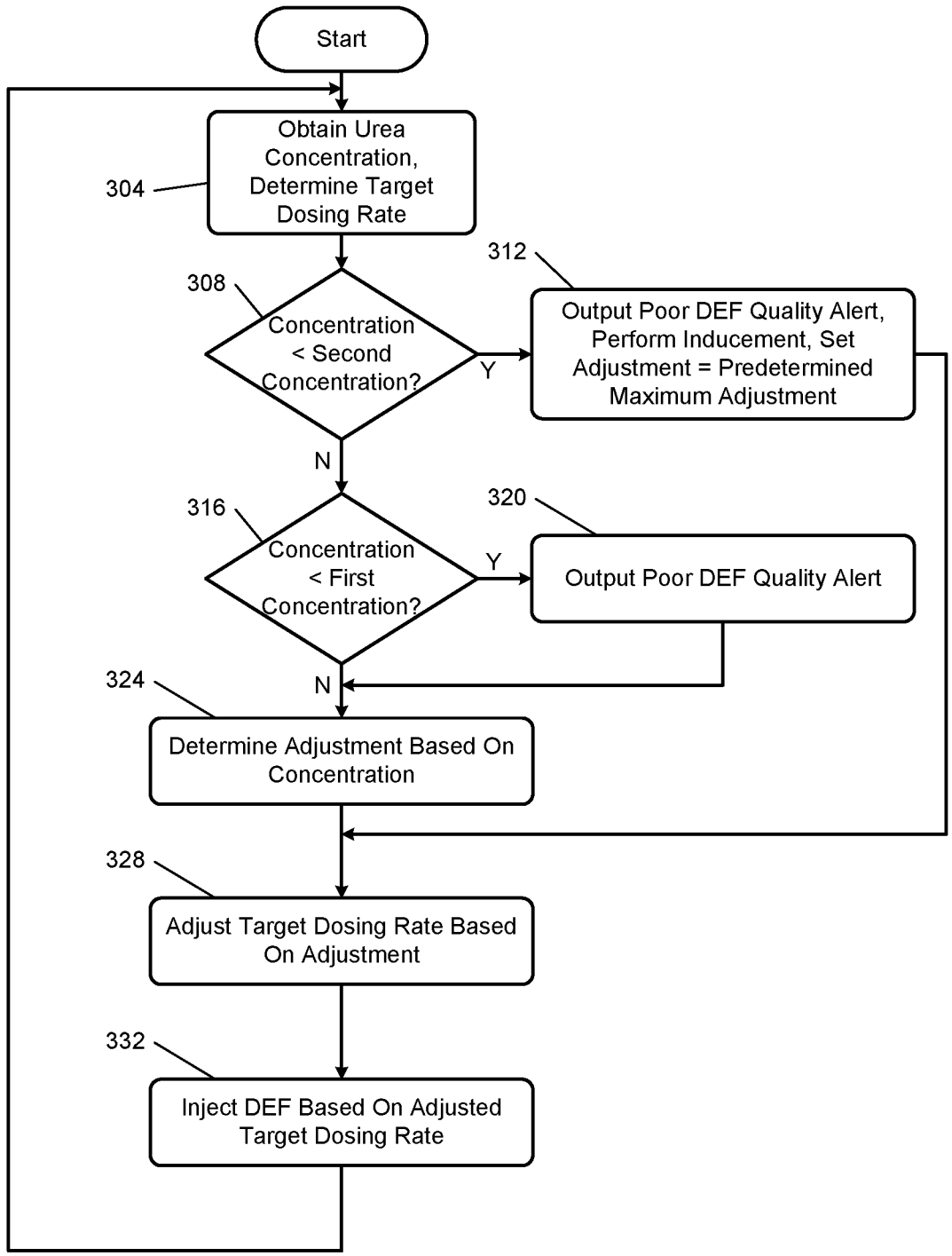
FIG. 3 is a flowchart depicting an example method of adjusting diesel exhaust fluid (DEF) injection, generating a poor DEF quality alert, and performing inducement based on a concentration of urea in DEF.

FIG. 3 is a flowchart depicting an example method of adjusting DEF injection, generating a poor DEF quality alert, and performing inducement based on the concentration 228 of urea in the DEF. Control may begin with 304 where the DEF control module 190 obtains the concentration 228 of urea in the DEF measured by the DEF quality sensor 160.

At 308, the adjustment module 224, the alert module 236, and the inducement module 240 determine whether the concentration 228 of urea is less than the second predetermined concentration of urea (e.g., 20% urea). If 308 is true, control transfers to 312. If 308 is false, control continues with 316. At 312, the adjustment module 224 may set the adjustment 216 to a predetermined maximum value (e.g., 1.5 in the example of multiplication), the alert module 236 outputs the poor DEF quality alert, and the inducement module 240 initiates or continues performance of an inducement event. Control continues with 328.

At 316, the adjustment module 224 and the alert module 236 determine whether the concentration 228 is less than the first predetermined concentration of urea (e.g., 25% urea). The first predetermined concentration is greater than the second predetermined concentration. If 316 is true, control transfers to 320. If 316 is false, the alert module 236 does not output the poor DEF quality alert and the inducement module 240 ends or continues not performing an inducement event, and control continues with 324. At 320, the alert module 236 outputs the poor DEF quality alert, and control continues with 324.

At 324, the adjustment module 224 determines the adjustment 216 based on the concentration 228 of urea in the DEF. The adjustment module 224 increases (e.g., non-linearly) the adjustment as the concentration 228 decreases and vice versa. For example, the adjustment module 224 may determine the adjustment 216 using one of an equation and a lookup table that relates urea concentrations to adjustments.

At 328, the adjusting module 212 adjusts the target dosing rate 208 based on the adjustment 216 to produce the adjusted target dosing rate 220. For example, the adjusting module 212 may set the adjusted target dosing rate 220 based on or equal to the target dosing rate 208 multiplied by the adjustment 216. As another example, the adjusting module 212 may set the adjusted target dosing rate 220 based on or equal to the target dosing rate 208 plus the adjustment 216. At 332, the injector control module 232 applies power to the DEF injector 130 based on the adjusted target dosing rate 220 to inject DEF at the adjusted target dosing rate 220. Control returns for a next control loop.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A diesel exhaust fluid (DEF) control system, comprising:
- a target module configured to determine a target rate of injection of a DEF by a DEF injector;
- an adjustment module configured to determine an adjustment based on a concentration of urea in the DEF;
- an adjusting module configured to adjust the target rate based on the adjustment to produce an adjusted rate of injection of the DEF by the DEF injector; and
- an injector control module configured to control injection of the DEF by the DEF injector based on the adjusted rate.

2. The DEF control system of claim 1 further comprising a sensor configured to measure the concentration of urea in the DEF.

3. The DEF control system of claim 2 wherein the sensor is configured to measure the concentration of urea in the DEF in a DEF tank.

4. The DEF control system of claim 2 wherein:
- the adjustment module is configured to set the adjustment to a predetermined value in response to a determination that a fault is present in the sensor; and
- the adjusting module is configured to set the adjusted rate equal to the target rate in response to the adjustment being set to the predetermined value.

5. The DEF control system of claim 1 wherein the adjusting module is configured to set the adjusted rate based on the target rate multiplied by the adjustment.

6. The DEF control system of claim 5 wherein the adjustment module is configured to increase the adjustment as the concentration of urea in the DEF decreases.

7. The DEF control system of claim 6 wherein the adjustment module is configured to decrease the adjustment as the concentration of urea in the DEF increases.

8. The DEF control system of claim 1 wherein the adjusting module is configured to set the adjusted rate based on the target rate plus the adjustment.

9. The DEF control system of claim 8 wherein the adjustment module is configured to increase the adjustment as the concentration of urea in the DEF decreases.

10. The DEF control system of claim 9 wherein the adjustment module is configured to decrease the adjustment as the concentration of urea in the DEF increases.

11. The DEF control system of claim 1 further comprising an alert module configured to output an alert when the concentration of urea in the DEF is less than a first predetermined concentration.

12. The DEF control system of claim 11 wherein the first predetermined concentration is greater than 20 percent urea by volume and less than 30 percent urea by volume.

13. The DEF control system of claim 11 further comprising an inducement module configured to initiate an inducement event when the concentration of urea in the DEF is less than a second predetermined concentration.

14. The DEF control system of claim 13 wherein the second predetermined concentration is less than the first predetermined concentration.

15. A vehicle control system, comprising:
- the DEF control system of claim 13; and
- an engine control module configured to, during the inducement event, limit torque output of a diesel engine to limit a speed of a vehicle to less than or equal to a predetermined maximum speed.

16. A vehicle control system, comprising:
- the DEF control system of claim 13; and
- an engine control module configured to, during the inducement event, limit a range of a vehicle to less than or equal to a predetermined maximum range.

17. The DEF control system of claim 1 wherein the adjustment module is configured to determine the adjustment using a lookup table that relates concentrations of urea to adjustments.

18. The DEF control system of claim 17 wherein entries of the lookup table are non-linear.

19. The DEF control system of claim 1 wherein the adjustment module is configured to determine the adjustment using an equation that relates concentrations of urea to adjustments.

20. A diesel exhaust fluid (DEF) control method, comprising:
- determining a target rate of injection of a DEF by a DEF injector;
- determining an adjustment based on a concentration of urea in the DEF;
- adjusting the target rate based on the adjustment thereby producing an adjusted rate of injection of the DEF by the DEF injector; and
- controlling injection of the DEF by the DEF injector based on the adjusted rate.

* * * * *